(12) United States Patent
Berchtold et al.

(10) Patent No.: US 7,600,791 B2
(45) Date of Patent: Oct. 13, 2009

(54) EXHAUST SYSTEM

(75) Inventors: Anton Berchtold, Gablingen (DE); Martin Adldinger, Holzheim (DE)

(73) Assignee: Emcon Technologies LLC, Wilmington, DE (US)

( * ) Notice: Subject to any disclaimer, the term of this patent is extended or adjusted under 35 U.S.C. 154(b) by 334 days.

(21) Appl. No.: 10/939,038

(22) Filed: Sep. 10, 2004

(65) Prior Publication Data

US 2006/0082142 A1   Apr. 20, 2006

(51) Int. Cl.
*F16L 27/04* (2006.01)

(52) U.S. Cl. .................. 285/261; 285/420

(58) Field of Classification Search .......... 285/261, 285/263, 51, 146.1, 278, 281, 420
See application file for complete search history.

(56) References Cited

U.S. PATENT DOCUMENTS

| | | | | |
|---|---|---|---|---|
| 488,946 | A * | 12/1892 | O'Neill | 285/51 |
| 1,350,393 | A | 8/1920 | Tzibides et al. | |
| 1,949,055 | A * | 2/1934 | Lambie | 285/5 |
| 2,381,426 | A * | 8/1945 | Allen et al. | 285/146.1 |
| 2,475,834 | A * | 7/1949 | Harvey | 285/271 |
| 3,596,934 | A * | 8/1971 | De Cenzo | 285/55 |
| 4,132,437 | A * | 1/1979 | Green | 285/263 |
| 4,762,330 | A | 8/1988 | Lönne et al. | |
| 4,815,771 | A * | 3/1989 | Paspati | 285/263 |
| 4,856,822 | A * | 8/1989 | Parker | 285/62 |
| 4,906,027 | A * | 3/1990 | De Gruijter | 285/51 |
| 5,290,075 | A * | 3/1994 | Allread | 285/261 |
| 5,374,086 | A * | 12/1994 | Higgins | 285/111 |
| 6,113,157 | A * | 9/2000 | Wilkins | 285/263 |
| 6,279,965 | B1 * | 8/2001 | Kida | 285/268 |
| 6,328,347 | B1 * | 12/2001 | Reder et al. | 285/261 |
| 6,460,898 | B1 * | 10/2002 | Chieh | 285/261 |
| 7,320,486 | B2 * | 1/2008 | Geppert et al. | 285/420 |
| 2004/0130149 | A1 * | 7/2004 | Gilmore | 285/261 |

FOREIGN PATENT DOCUMENTS

| | | |
|---|---|---|
| DE | 2627375 | 12/1977 |
| DE | 3512751 C2 | 2/1987 |
| DE | 196 08 870 C1 * | 10/1997 |
| DE | 195 08 979 C2 | 8/2000 |
| DE | 199 64 223 A1 | 6/2001 |
| EP | 0211454 | 6/1986 |
| EP | 0 213 384 A1 * | 7/1986 |
| FR | 2297322 | 6/1976 |
| FR | 2315605 | 1/1977 |
| FR | 2596492 | 3/1986 |
| FR | 2 577 986 | 8/1986 |
| JP | 50-139428 | 7/1975 |
| JP | 7-174273 | 7/1995 |
| WO | WO 94/03417 | 2/1994 |

OTHER PUBLICATIONS

European Search Report for Application No. 04 011 629.5-1263, dated Aug. 19, 2005, 14 pages.
English abstract for Japanese patent publication No. 07174273, 1 page.

* cited by examiner

*Primary Examiner*—James M Hewitt
(74) *Attorney, Agent, or Firm*—Barnes & Thornburg

(57) ABSTRACT

An exhaust system comprises first and second pipes and a sealing ring. The first pipe comprises a first pipe. The second pipe comprises a second pipe extending into the first pipe. The sealing ring is positioned between the first and second pipes so as to establish a sealed connection therebetween.

24 Claims, 2 Drawing Sheets

EXHAUST SYSTEM

FIELD OF THE DISCLOSURE

The present disclosure relates to an exhaust system.

BACKGROUND OF THE DISCLOSURE

Exhaust systems are used to conduct and often treat exhaust gas discharged from an engine of a motor vehicle or other exhaust gas producer. The exhaust system may comprise a number of pipes, some of which may be connected to each other.

SUMMARY OF THE DISCLOSURE

According to an aspect of the present disclosure, an exhaust system comprises first and second pipes and a sealing ring. The first and second pipes are detachably connected to each other. The second pipe comprises two spherical application surfaces mating against a spherical sealing surface of the first pipe. The sealing ring contacts the sealing surface and contacts the second pipe at a location between the application surfaces so as to establish a sealed connection between the first and second pipes.

According to another aspect of the disclosure, the second pipe extends into the first pipe. An inner surface of the first pipe provides the sealing surface. An outer surface of the second pipe provides the two application surfaces. The sealing ring is positioned in a groove defined by a crimp formed in the second pipe between the application surfaces. A spherical clamp engages outer surfaces of the first and second pipes so as to clamp the first and second pipes together.

DETAILED DESCRIPTION OF THE DRAWINGS

Figure 1:
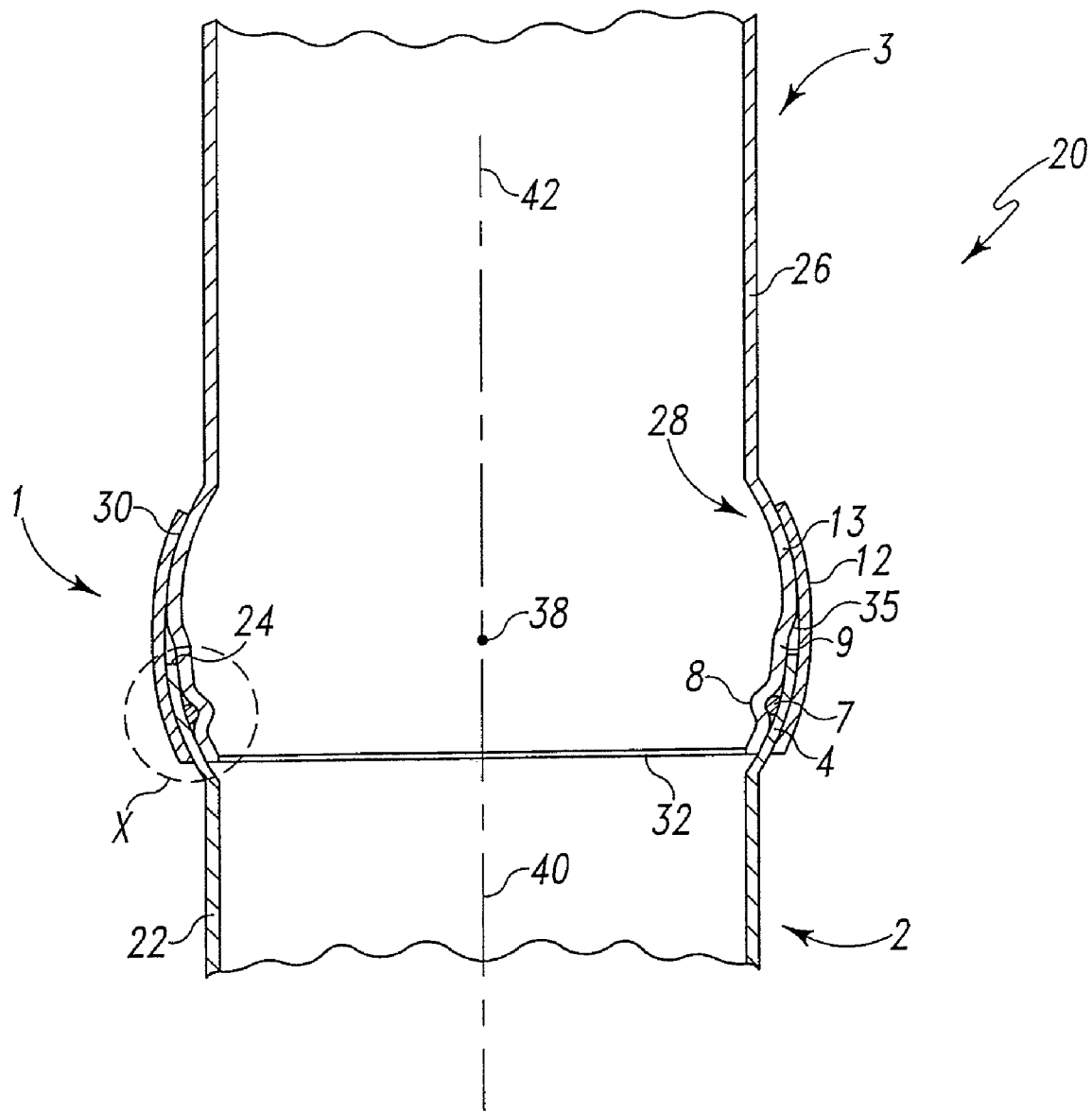
FIG. 1 is a longitudinal sectional view of an exhaust system, with portions broken away.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 2:
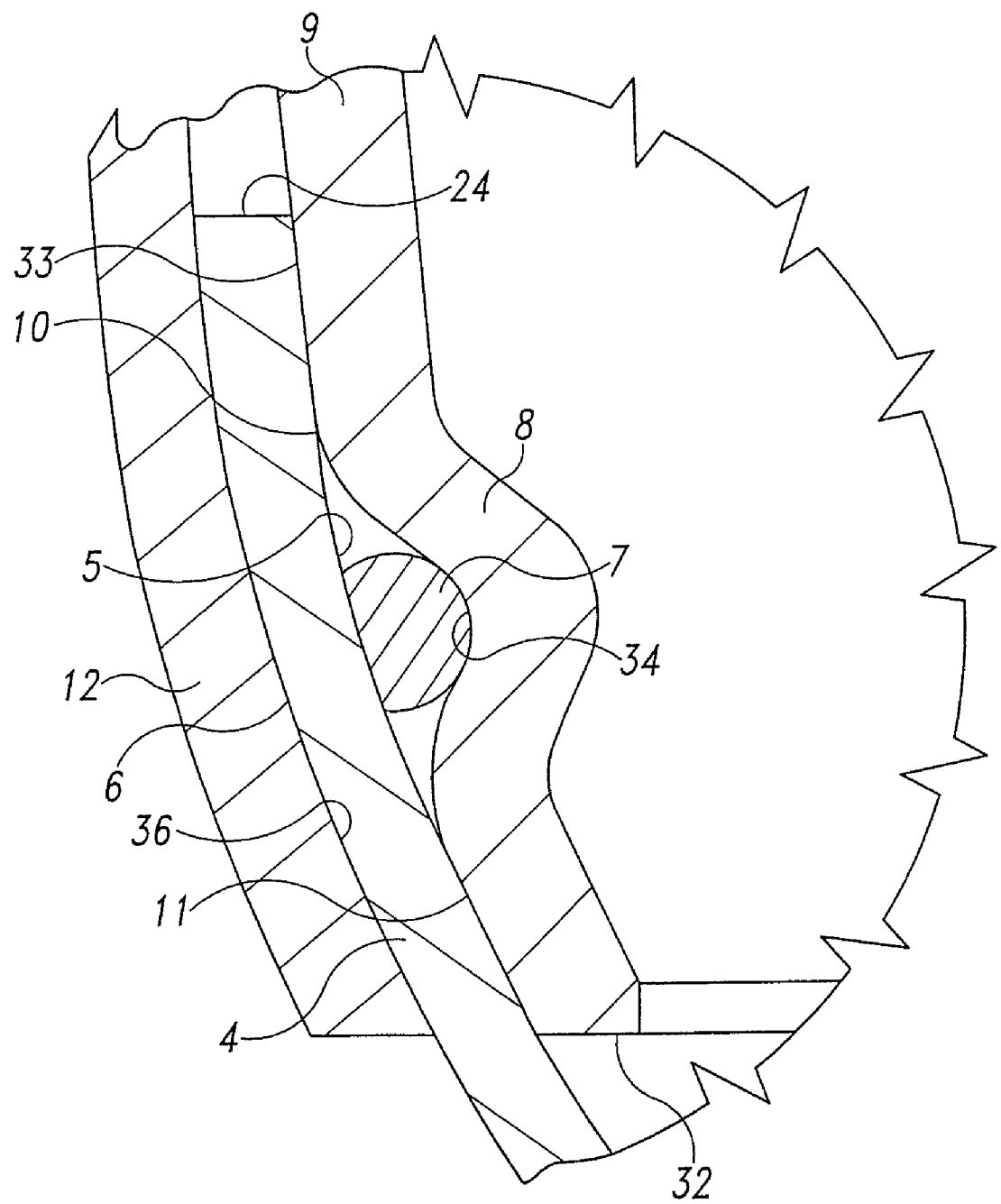
FIG. 2 is an enlarged view of a detail X of FIG. 1.

Referring to FIGS. 1 and 2, an exhaust system 20 for conducting exhaust gas discharged from a motor vehicle internal combustion engine or other exhaust gas producer comprises a first pipe 2 and a second pipe 3. A clamp 12 detachably clamps the first and second pipes 2, 3 together. A sealing ring 7 positioned between the pipes 2, 3 establishes a sealed connection therebetween. Together, the first pipe 2, the second pipe 3, the clamp 12, and the sealing ring 7 provide a spherical connection 1 that connects pipes 2, 3 to each other.

The first pipe 2 comprises a first tube 22 and a first tulip-shaped expansion 4. The first tulip-shaped expansion 4 extends radially outwardly from the first tube 22 to a first end 24 of the first pipe 2. The first tulip-shaped expansion 4 comprises an inner spherical sealing surface 5 and an outer spherical clamp-receiving surface 6.

The second pipe 3 comprises a second tube 26 and a second tulip-shaped expansion 28. The second tulip-shaped expansion 28 comprises a first region 13 and a second region 9. The first region 13 extends radially outwardly from the second tube 26 to the second region 9 and comprises an outer spherical clamp-receiving surface 30. The second region 9 extends radially inwardly from the first region 13 to a second end 32 of the second pipe 3 and extends into the first tulip-shaped expansion 4.

An outer surface 33 of the second region 9 comprises two outer spherical application surfaces 10, 11 and a groove 34. Each application surface 10, 11 mates against the sealing surface 5 to define a spherical interface between the application surface 10, 11 and the sealing surface 5. Groove 34 is located between application surfaces 10, 11 and is provided by a crimp 8 formed in second region 9. Sealing ring 7 is positioned in groove 34 so as to contact groove 34 and sealing surface 5 and thereby establish a sealed connection between first and second tulip-shaped expansions 4, 28. The outer surface 33 further comprises a transition surface 35 connecting the application surface 10 and the clamp-receiving surface 30.

The spherical clamp 12 comprises an inner spherical clamp surface 36. The clamp surface 36 mates against the clamp-receiving surfaces 6, 30 and extends over the transition surface 35 so as to detachably clamp first and second tulip-shaped expansions 4, 28.

As shown in FIG. 2, the clamp surface 36 is defined by a generally constant radius and is positioned in an overlapping relationship with the sealing surface 5, the two outer spherical application surfaces 10, 11, and the groove 34. The clamp surface 36, the clamp-receiving surfaces 6, 30, the sealing surface 5, and the application surfaces 10, 11 have a common center of curvature 38. Such a configuration facilitates uniform, face-to-face contact between the clamp surface 36 and the clamp-receiving surfaces 6, 30 and uniform, face-to-face contact between the sealing surface 5 and the application surfaces 10, 11 regardless whether the longitudinal axes 40, 42 of the first and second pipes 2, 3 are coincident (as in FIG. 1) or angled relative to each other. The relatively large face-to-face contact promotes a relatively tight connection. The relatively large face-to-face contact further promotes transfer of mechanical loads primarily between such surfaces rather than through the sealing ring 7 to promote durability of the sealing ring 7.

It is within the scope of this disclosure for application surfaces 10, 11 not to extend all the way around axis 42. Rather, each surface 10, 11 may be divided into several individual zones so that the force transfer between connected components is distributed among the several individual zones. It is also within the scope of this disclosure for the clamp-receiving surface 30 to have a conical shape or other suitable non-spherical shape.

The spherical connection 1 can be readily disassembled and reassembled. Function of the spherical connection 1 will not be impaired even if the first and second pipes 2, 3 deviate from their original position upon reassembly. As such, the exhaust system 20 is useful on a variety of vehicles including, for example, motorcycles. The muffler of a motorcycle may need to be removed from time to time to allow changing of the rear wheel of the motorcycle. The spherical connection 1 facilitates such removal and reattachment of the muffler. Further, the spherical connection 1 presents a relatively smooth outer surface which may be aesthetically desirable in connection with exposed exhaust systems of some motorcycles. The exhaust system 20 may thus be a motorcycle exhaust system.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. An exhaust system, comprising:
    first and second pipes detachably connected to each other, the first pipe comprising a spherical sealing surface, the second pipe comprising two spherical application surfaces mating against the spherical sealing surface,
    a sealing ring contacting the spherical sealing surface and contacting the second pipe at a location between the two spherical application surfaces as to establish a sealed connection between the first and second pipes, and
    a clamp detachably clamping the first and second pipes together, the clamp having a continuous inner spherical clamp surface extending from one axial end to the opposing axial end of the clamp where one of the opposing ends contacts the first pipe and the other of the opposing ends contacts the second pipe.

2. The exhaust system of claim 1, wherein the first pipe comprises a tulip-shaped expansion comprising an inner surface defining the sealing surface.

3. The exhaust system of claim 2, wherein:
    the clamp is a spherical clamp, and
    one opposing end of the spherical clamp mates against a spherical outer surface of the tulip-shaped expansion and wherein the other opposing end of the spherical clamp mates against a spherical outer surface of the second pipe, and wherein the continuous inner spherical clamp surface, the spherical sealing surface, and the two outer spherical application surfaces have a common center of curvature.

4. The exhaust system of claim 1, wherein the second pipe comprises a tulip-shaped expansion comprising an outer surface and a crimp, the outer surface defines the two spherical application surfaces, and the crimp is positioned between the two spherical application surfaces and receives the sealing ring.

5. The exhaust system of claim 4, wherein:
    the clamp is a spherical clamp, and
    wherein one opposing end of the spherical clamp mates against the tulip-shaped expansion and the other opposing end of the spherical clamp mates against a spherical outer surface of the first pipe.

6. The exhaust system of claim 1, wherein:
    the clamp is a spherical clamp, and
    each of the first pipe and the second pipe comprises a tulip-shaped expansion, and wherein opposing ends of the spherical clamp respectively clamp against the tulip-shaped expansions of the first and second pipes.

7. the exhaust of claim 1, wherein:
    the first pipe comprises a first tube and a first tulip-shaped expansion extending radially outwardly from the first tube to a first end of the first pipe,
    an inner surface of the first tulip-shaped expansion defines the sealing surface,
    the second pipe comprises a second tube and a second tulip-shaped expansion,
    the second tulip-shaped expansion comprises a first region extending radially outwardly from the second tube and a second region extending radially inwardly from the first region toward a second end of the second pipe, and
    an outer surface of the second region defines the two spherical application surfaces and a groove that is located between the two spherical application surfaces and receives the sealing ring.

8. The exhaust system of claim 7, wherein the clamp is a spherical clamp that clamps against an outer surface of the first-tulip-shaped expansion and an outer surface of the first region.

9. The exhaust of claim 1, wherein the exhaust system is a motorcycle exhaust system and the clamp permits disassembly and reassembly of at least a portion of the motorcycle exhaust system.

10. The exhaust system of claim 1 wherein the continuous inner spherical clamp surface is defined by a constant radius.

11. An exhaust system, comprising:
    first and second pipes, the first pipe comprising an inner spherical sealing surface, the second pipe extending into the first pipe and comprising two outer spherical application surfaces and a groove positioned between the two outer spherical application surfaces, the two outer spherical application surfaces mating against the inner spherical sealing surface,
    a clamp detachably clamping the first and second pipes together, the clamp having a continuous inner spherical clamp surface extending from one axial end to the opposing axial end of the clamp where one of the opposing ends contacts the first pipe and the other of the opposing ends contacts the second pipe, and
    a sealing ring positioned in the groove and contacting the inner spherical sealing surface so as to establish a sealed connection between the first pipe and the second pipe, and wherein the continuous inner spherical clamp surface is positioned in an overlapping relationship with the inner spherical sealing surface, the two outer spherical applications surfaces, and the groove.

12. The exhaust system of claim 11, wherein:
    the first pipe comprises a first tulip-shaped expansion that comprises the inner spherical sealing surface,
    the second pipe comprises a second tulip-shaped expansion that comprises the two outer spherical application surfaces and the groove, and
    the first tulip-shaped expansion is positioned between the second tulip-shaped expansion and the clamp such that one opposing end of the continuous inner spherical clamp surface directly abuts against an outer spherical surface of the first tulip-shaped expansion and the other opposing end of the continuous inner spherical clamp surface directly abuts against an outer spherical surface of the second tulip-shaped expansion.

13. The exhaust system of claim 11, wherein the second pipe comprises a transition surface extending radially inwardly from a clamp-receiving surface of the second pipe to one of the two outer spherical application surfaces, and the continuous inner spherical clamp surface extends from a clamp-receiving surface of the first pipe over the transition surface to the clamp-receiving surface of the second pipe.

14. The exhaust system of claim 11 wherein the continuous inner spherical clamp surface is defined by a constant radius, and wherein the continuous inner spherical clamp surface, the spherical sealing surface, and the two outer spherical application surfaces have a common center of curvature.

15. The exhaust system of claim 11 wherein the exhaust system is a vehicle exhaust system and the clamp permits disassembly and reassembly of at least a portion of the vehicle exhaust system.

16. An exhaust system, comprising:
a first pipe comprising a first tube and a first tulip-shaped expansion extending from the first tube to a first end of the first pipe, the first tulip-shaped expansion comprising an inner spherical sealing surface,
a second pipe comprising a second tube and a second tulip-shaped expansion extending from the second tube to a second end of the second pipe and extending into the first tulip-shaped expansion, the second tulip-shaped expansion comprising two outer spherical application surfaces and a groove positioned between the two outer spherical application surfaces, the two outer spherical application surfaces mating against the inner spherical sealing surface,
a spherical clamp detachably clamping the first tulip-shaped expansion and the second tulip-shaped expansion together to permit disassembly and reassembly of at least a portion of the exhaust system, the spherical clamp having a continuous inner spherical clamp surface extending from one axial end to the opposing axial end of the clamp where one of the opposing ends contacts an outer surface of the first tulip-shaped expansion and the other of the opposing ends contacts an outer surface of the second tulip-shaped expansion, and
a sealing ring positioned in the groove and contacting the inner spherical sealing surface to establish a seal connection between the first tulip-shaped expansion and the second tulip-shaped expansion.

17. The exhaust system of claim 16, wherein the first tulip-shaped expansion extends radially outwardly from the first tube to the first end, the first tulip-shaped expansion being positioned directly between the spherical clamp and the second tulip-shaped expansion such that the outer surface of the first tulip-shaped expansion directly contacts the continuous inner spherical clamp surface and the inner spherical sealing surface directly contacts the sealing ring and the two outer spherical application surfaces.

18. The exhaust system of claim 16, wherein the second tulip-shaped expansion comprises a first region and a second region, the first region extends radially outwardly from the second tube to the second region, the second region extends radially inwardly from the first region toward the second end, and the second region comprises the two application surfaces and the groove.

19. The exhaust system of claim 16, wherein:
the first tulip-shaped expansion comprises an outer spherical first clamp-receiving surface,
the second tulip-shaped expansion comprises an outer spherical second clamp-receiving surface,
the continuous inner spherical clamp surface of the clamp mates against the first and second clamp-receiving surfaces, and
the continuous inner spherical clamp surface, the first and second clamp-receiving surfaces, and sealing surface, and the two outer spherical application surfaces have a common center of curvature.

20. An exhaust system, comprising:
first and second pipes detachably connected to each other, the first pipe comprising an inner spherical sealing surface, the second pipe comprising an outer spherical sealing surface mating against the inner spherical sealing surface,
a sealing ring contacting the inner and outer spherical sealing surfaces to establish a sealed connection between the first and second pipes, and
a clamp detachably clamping the first and second pipes together to permit disassembly and reassembly of at least a portion of the exhaust system, the clamp having a continuous inner spherical clamp surface extending from one axial end to the opposing axial end of the clamp where one of the opposing ends contacts an outer spherical surface of the first pipe and the other of the opposing ends contacts an outer spherical surface of the second pipe.

21. The exhaust system of claim 20 wherein the first pipe comprises a first tube and a first tulip-shaped expansion extending from the first tube to a first end of the first pipe, the first tulip-shaped expansion comprising the inner spherical sealing surface, and wherein the second pipe comprises a second tube and a second tulip-shaped expansion extending from the second tube to a second end of the second pipe and extending into the first tulip-shaped expansion, the second tulip-shaped expansion comprising the outer spherical sealing surface, and wherein the outer spherical sealing surface comprises two outer spherical application surfaces and a groove positioned between the two outer spherical application surfaces with the sealing ring being received within the groove.

22. The exhaust system of claim 21 wherein the continuous inner spherical clamp surface is defined by a constant radius, and wherein the continuous inner spherical clamp surface, the inner spherical sealing surface, and the two outer spherical application surfaces have a common center of curvature.

23. The exhaust system of claim 21 wherein the second tulip-shaped expansion includes a transition surface extending radially inwardly from a clamp-receiving surface of the second pipe to one of the two outer spherical application surfaces, and the continuous inner spherical clamp surface extends from a clamp-receiving surface of the first pipe over the transition surface to the clamp-receiving surface of the second pipe.

24. The exhaust system of claim 22 wherein the second end of the first pipe is positioned directly between the clamp and the one of the two outer spherical application surfaces forming a gap that is bounded by the transition surface, the continuous inner spherical clamp surface, and the second end of the first pipe.

* * * * *